US009674891B2

(12) United States Patent
Engelhart, Sr.

(10) Patent No.: US 9,674,891 B2
(45) Date of Patent: Jun. 6, 2017

(54) COMMUNICATIONS PATH SELECTION IN USER EQUIPMENT

(71) Applicant: AT&T Mobility II LLC, Atlanta, GA (US)

(72) Inventor: Robert Lee Engelhart, Sr., Kirkland, WA (US)

(73) Assignee: AT&T Mobility II LLC, Atanta, GA (US)

( * ) Notice: Subject to any disclaimer, the term of this patent is extended or adjusted under 35 U.S.C. 154(b) by 0 days.

(21) Appl. No.: 14/837,973

(22) Filed: Aug. 27, 2015

(65) Prior Publication Data

US 2015/0373779 A1      Dec. 24, 2015

Related U.S. Application Data

(63) Continuation of application No. 11/753,601, filed on May 25, 2007, now Pat. No. 9,125,228.

(51) Int. Cl.
*H04M 1/00* (2006.01)
*H04W 88/06* (2009.01)
(Continued)

(52) U.S. Cl.
CPC ..... *H04W 88/06* (2013.01); *H04M 1/274508* (2013.01); *H04M 1/72519* (2013.01); *H04W 48/18* (2013.01); *H04M 2250/66* (2013.01)

(58) Field of Classification Search
CPC ..... H04W 48/18; H04W 48/16; H04W 8/183; H04W 76/02; H04W 84/12; H04W 88/06;
(Continued)

(56) References Cited

U.S. PATENT DOCUMENTS 6,317,597 B1    11/2001   Baker et al.
6,771,964 B1 *   8/2004   Einola ............... H04W 36/0066
                                                       370/331
(Continued)

FOREIGN PATENT DOCUMENTS

WO        2005039112        4/2005

OTHER PUBLICATIONS

U.S. Office Action dated Jan. 25, 2010 in U.S. Appl. No. 11/753,601.
(Continued)

*Primary Examiner* — Fred Casca
(74) *Attorney, Agent, or Firm* — Hartman & Citrin LLC (57) ABSTRACT

Architecture that allows a user to control the way a connection is made to a destination. A destination can be tagged with an attribute that defines how the connection to that destination should be routed. For example, a phone address book allows the user to not only enter the usual call recipient information such as name and telephone number, but also to add an attribute in the form of a network identifier associated with a network that should be used when connecting to the destination. Where multiple networks are associated with the destination, the phone subsystem, recognizing that the destination now has multiple network IDs for connecting the call, can prompt the user to select the desired network pathway. The user can also tag the destination with a protocol that should be employed. Thus, not only will the phone be connected according to the network, but according to the protocol.

20 Claims, 10 Drawing Sheets

(51) Int. Cl.
*H04W 48/18* (2009.01)
*H04M 1/2745* (2006.01)
*H04M 1/725* (2006.01)

(58) Field of Classification Search
CPC . H04W 8/005; H04W 16/00; H04W 36/0022; H04W 36/14; H04W 36/18; H04W 36/28; H04W 48/20
USPC ...... 455/435.2, 552.1, 411, 414.1, 418, 41.2, 455/566; 370/259
See application file for complete search history.

(56) References Cited

U.S. PATENT DOCUMENTS

| | | | |
|---|---|---|---|
| 7,212,810 B2 | 5/2007 | Babbar et | |
| 2003/0114174 A1 | 6/2003 | Walsh et al. | |
| 2003/0203744 A1* | 10/2003 | Otsuka | H04M 1/7253 455/551 |
| 2004/0068571 A1 | 4/2004 | Ahmavaara | |
| 2005/0193150 A1* | 9/2005 | Buckley | H04W 48/18 709/250 |
| 2006/0094407 A1 | 5/2006 | Karaoguz et al. | |
| 2007/0091861 A1* | 4/2007 | Gupta | H04L 12/24 370/338 |
| 2007/0111568 A1* | 5/2007 | Ferrari | H04L 12/2807 439/131 |
| 2007/0218924 A1 | 9/2007 | Burman et al. | |
| 2007/0274482 A1* | 11/2007 | Rauba | H04M 15/00 379/114.03 |
| 2008/0123843 A1* | 5/2008 | Machani | H04L 9/0822 380/44 |
| 2008/0182615 A1 | 7/2008 | Xue et al. | |
| 2008/0280588 A1 | 11/2008 | Roundtree et al. | |

OTHER PUBLICATIONS

U.S. Office Action dated Jul. 20, 2010 in U.S. Appl. No. 11/753,601.
U.S. Office Action dated Feb. 1, 2012 in U.S. Appl. No. 11/753,601.
U.S. Office Action dated Jul. 12, 2012 in U.S. Appl. No. 11/753,601.
U.S. Office Action dated Aug. 20, 2013 in U.S. Appl. No. 11/753,601.
U.S. Office Action dated Mar. 25, 2014 in U.S. Appl. No. 11/753,601.
U.S. Office Action dated Jan. 13, 2015 in U.S. Appl. No. 11/753,601.
U.S. Notice of Allowance dated Apr. 22, 2015 in U.S. Appl. No. 11/753,601.

* cited by examiner

COMMUNICATIONS PATH SELECTION IN USER EQUIPMENT

CROSS REFERENCE TO RELATED APPLICATION

This application is a continuation of U.S. application Ser. No. 11/753,601, filed May 25, 2007, now U.S. Pat. No. 9,125,228, the entirety of which is herein incorporated by reference.

TECHNICAL FIELD

This invention relates to wireless communication systems, and more specifically, to the selection of networks via a mobile device.

BACKGROUND

Telecommunications is a rapidly evolving industry that has exploded in recent years with many types of services and supporting systems coming to market. The convergence of the Internet and wireless communications has opened the door for providing services that heretofore were not available to the cellular user. Cellular telephones have been widely accepted because of the low cost and allow individuals to move about freely yet stay in contact with friends, and further, to function as sources of information including data and multimedia files.

Mobile subscribers are interested in at least the same wide variety of content that can be accessed via computers on global IP networks such as the Internet. For example, subscribers can input requests to providers for multimedia services that include information related to news, weather, traffic, stock information, game downloading, ring tone music downloads, streaming video content, and more. For some of these services such as streaming video or game downloading, subscribers are more cost conscious rather than caring about the specific time of the day the services can be provided. Moreover, for some of these services, many subscribers may desire common content and not care if they receive the service via a broadcast technology or peer-to-peer technique.

New and updated mobile networks and associated services will continue to be brought online as technology continues to evolve in order to meet consumer demand. However, mobile telephone networks are expensive to build and once implemented, need to be maintained for some time based on the large number of phones sold to use the network and services. Multimode phones are an attempt to address the variety of networks and services available to users. However, phone users are still limited in the networks and ways in which information can be communicated to destinations.

SUMMARY

The following presents a simplified summary in order to provide a basic understanding of some aspects of the disclosed architecture. This summary is not an extensive overview, and it is not intended to identify key/critical elements or to delineate the scope thereof. Its sole purpose is to present some concepts in a simplified form as a prelude to the more detailed description that is presented later.

The disclosed innovative architecture is a mechanism that allows a user to control the way a connection is made to a destination. A destination can be tagged with an attribute that defines how the connection to that destination should be routed. In one example, a phone address book allows the user to not only enter the usual call recipient information such as name, telephone number, etc., but to also add an attribute in the form of a network identifier (ID) associated with a network and used when connecting to the destination.

A destination can be tagged with a GSM (global system for mobile communications) network ID, such that when the phone user initiates a call to the destination the phone automatically connects to the destination over the GSM network. Similarly, the same destination can have another entry that includes an attribute for the UMTS (universal mobile telecommunications system) network. Accordingly, when the user selects that destination for a call, the phone subsystem, recognizing that the destination now has multiple network IDs for connecting the call, can prompt the user to select the desired network pathway.

The network ID can also be a string (e.g., number or alphanumeric), a symbol, an icon (e.g., image or graphic), audio data, tactile, character representation (e.g., special characters), or combinations thereof and the like, that when processed effects selection of a network or communication path, for example. If not defined by the user the ID can default to a value which may be "NULL" or an assigned value, for example. If "NULL", then a suitable destination can be selected at runtime.

In another implementation, the user can tag the destination with a protocol ID associated with a protocol that is desired to be employed. For example, the available networks may be able to process IP connections (e.g., VoIP). Thus, not only will the destination be tagged with the network ID but also the protocol ID (e.g., SIP) via which the connection should be made. The protocol ID can be a number, a symbol, an icon (e.g., image or graph), audio data, tactile, character representation, or combinations thereof and the like. If not defined by the user the ID can default to a value which may be "NULL" or an assigned value. If "NULL", then a suitable protocol can be selected at runtime.

To the accomplishment of the foregoing and related ends, certain illustrative aspects of the disclosed architecture are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

As required, detailed novel embodiments are disclosed herein. It must be understood that the disclosed embodiments are merely exemplary and may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the invention. Therefore, specific structural and functional details disclosed herein are not to be interpreted as limiting, but merely as a basis for the claims and as a representative basis for teaching one skilled in the art to variously employ the invention.

Although applicable to any existing or yet to be developed wireless telecommunications network, the aspects of the invention will be described with reference to the global system for mobile communications (GSM) air interface that uses general packet radio service (GPRS) as an enabling bearer. Examples of other suitable wireless and radio frequency data transmission systems include networks utilizing time division multiple access (TDMA), frequency division multiple access (FDMA), wideband code division multiple access (WCDMA), orthogonal frequency division multiplexing (OFDM), wireless fidelity (Wi-Fi), and various other 2.5 and 3G (third generation) and above wireless communications systems. Examples of other suitable enabling bearers include universal mobile telecommunications system (UMTS), enhanced data rates for global evolution (EDGE), high speed downlink/uplink packet access (HSDPA/HSUPA), voice over internet protocol (VoIP), and similar communications protocols.

Figure 1:
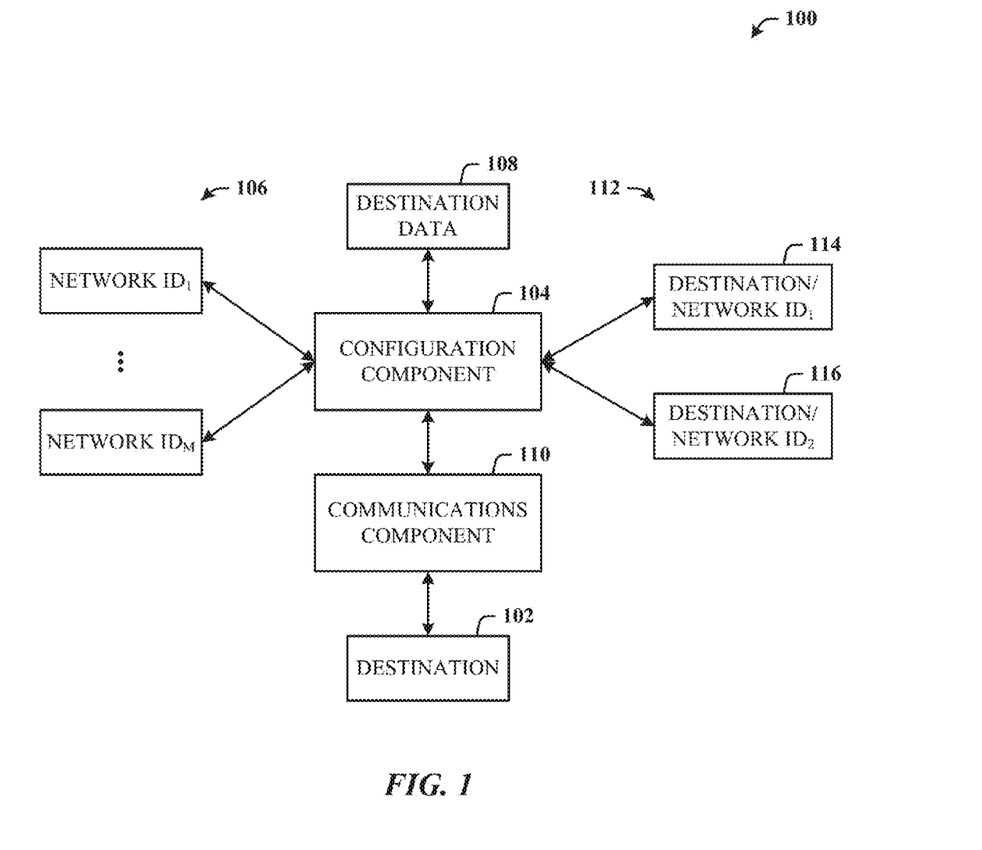
FIG. 1 illustrates a multimode mobile device system for associating one or more communications networks with a destination, according to the present invention.

Referring initially to FIG. 1, there is illustrated a multimode mobile device system 100 for associating one or more communications networks with a destination 102. The system 100 includes a configuration component 104 for assigning one or more network identifiers (IDs) 106 (denoted NETWORK ID$_1$, . . . , NETWORK ID$_M$, where M is a positive integer) of corresponding communications networks to destination data 108. The system 100 also includes a communications component 110 for automatically connecting to the destination 102 based on the one or more network identifiers 106. The destination 102 can be a user or another device (e.g., fax, voicemail system, etc.). The network information can also include at least one of a communications protocol, a signaling path, or a bearer path.

The one or more network identifiers 106 can be assigned (or tagged attributes) to the destination data 108 via the configuration component as entries 112 in a stored relationship (e.g., a table, address book, etc.). For example, the entries 112 can include a first entry 114 (denoted DESTINATION/NETWORK ID$_1$) and/or a second entry 116 (denoted DESTINATION/NETWORK ID$_2$). Thus, when the system user selects the destination 102, the user can be presented with options to select the first entry 114 and/or the second entry 116 for making the connection to the destination 102. The entries 112 can be stored local to the system 100. Alternatively, or in combination therewith, the entries 112 can be stored remotely such that the system user can access the local entries and/or the remote entries.

The network ID 106 can also be a string (e.g., number or alphanumeric), a symbol, an icon (e.g., image or graphic), audio data, tactile data, character representation (e.g., special characters), or combinations thereof and the like, that when processed effects selection of a network or communication path, for example. If not defined by the user the ID can default to a value that may be "NULL" or an assigned value, for example. If "NULL", then a suitable destination can be selected at runtime.

The network identifiers 106 can be associated with corresponding network types, for example, an unsecured network (e.g., Wi-Fi, Wi-Max, Bluetooth), a 2G network (e.g., GSM), a 3G network (e.g., UMTS), an IP network (e.g., the Internet, IMS-IP Multimedia Subsystem), 4G network, and so on.

Figure 2:
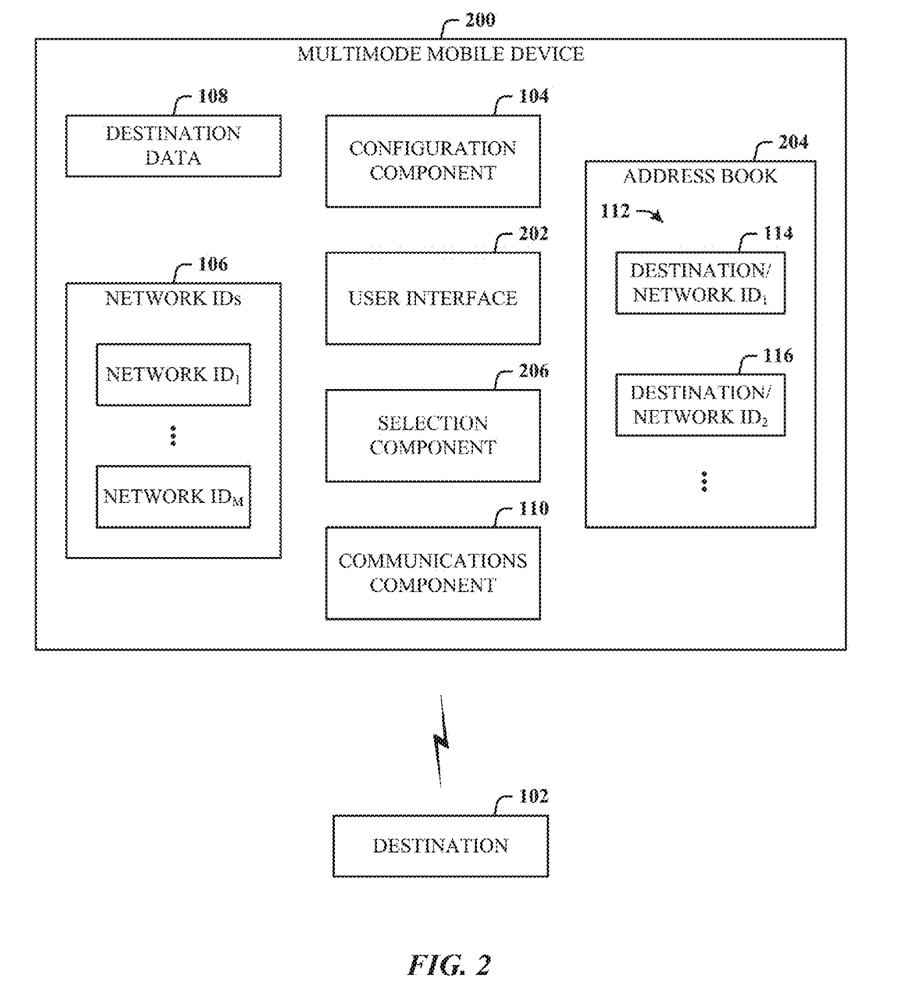
FIG. 2 illustrates an alternative implementation of a multimode mobile device that employs the system of FIG. 1, according to the present invention.

FIG. 2 illustrates an alternative implementation of a multimode mobile device 200 that employs the system 100 of FIG. 1. The device 200 includes the configuration component 104 and communications component 110 of FIG. 1 for configuring the relationships between the destination 102 (or destination data 108) and the "available" networks that can be used to send voice signals and/or data (e.g., images, video, text, etc.). The term "available" is used to indicate that although the destination 102 may be configured according to a first network (e.g., GSM, associated with NETWORK ID$_1$), the first network may be overloaded, the device 200 may be out of the service coverage area, the destination connection may be busy, and so on. Thus, if a second network (e.g., UMTS) is designated for the destination 102 and is available, the connection can be made via the second network (associated with NETWORK ID$_2$). This can be an automatic process that connects the secondary path to the destination 102 without user interaction, or require user interaction by prompting the user to decide whether to use an alternate connection.

The system 200 also includes a user interface 202 via which the device user can interact with device functionality, such as for editing a device address book 204 in which the destination (or contact) entries 112 are stored. In other words, the user can enter destination data (e.g., name, phone number, etc.) and then also enter a network ID (e.g., GSM, UMTS, VoIP, etc.) for that destination. Given the number of different networks and the ways in which a single destination can be connected to, for example, PSTN, GSM, UMTS, IMS, the Internet, Wi-Fi, Wi-Max, Bluetooth, the single destination 102 can include several entries in the address book that define the several ways in which the device user can choose to reach the destination 102. For example, the first entry 114 indicates that the destination 102 can be reached according to a first network (e.g., GSM) associated with the NETWORK ID$_1$, and the second entry 116 indicates that the destination 102 can be reached according to a second network (e.g., UMTS) associated with the NETWORK ID$_2$.

It is also possible to configure the destination entry to include the same network (e.g., UMTS), but via different protocols (e.g., cellular versus VoIP versus SIP (session initiation protocol)).

The device 200 can also include a selection component 206 for automatically selecting the communications network to connect the device 200 to the destination 102 based on the network identifier (e.g., NETWORK $ID_1$). The selection component 206 also facilitates manually selecting the communications network to connect to the destination 102 based on the network identifier.

Selection of a network can be based on other criteria. For example, the selection component 206 can be configured via the configuration component 104 for automatically selecting the communications network based on user preferences that have been entered into the device 200 or which can be retrieved from a remote location. Alternatively, or in combination therewith, the user preferences can be stored remotely in association with a user account such that the preferences can be accessed and processed to make the desired selection.

In yet another example, selection can be performed automatically based on a subscription plan. In other words, the user can subscribe to different levels of service. Although the device 200 may be multimodal, not all functionality may be enabled due to the level of subscription of the device user. The user may have a basic level of service that allows communication over a first network (e.g., GSM) but not a second network (e.g., UMTS).

In still another example, selection can be performed automatically based on a network bandwidth. For example, the destination 102 may be reachable according to a UMTS network and/or VoIP over the PSTN (public switch telephone network). If the bandwidth for the UMTS network is greater than VoIP over the PSTN, the selection component 206 can be configured to select the pathway having the greater bandwidth capability.

In another example, the selection can be performed automatically based on cost or pricing of the connection (or service). For example, the destination 102 may be reachable according to a UMTS network and a GSM network. If the cost of using the UMTS network is greater than the cost of using the GSM network, the selection component 206 can be configured to select the network connection having the lower cost (the GSM network).

As illustrated by these examples, the criteria for selecting between multiple network connections can be many, and can be made user configurable in the device 200. As another example, the selection can be performed automatically based on reliability of the network connection.

It is within contemplation of the subject invention that the device 200 can be configured to select between not only different networks, but also between different carriers (or operators). For example, it is commonplace that a first carrier may provide coverage in a geographic area, but a second carrier may not. Thus, the device 200 can be configured to select the first carrier although the device user is a subscriber of the second carrier. Of course, this can require cross-carrier accounting, pricing, premium rates, etc., which is now possible using the disclosed architecture.

Figure 3:
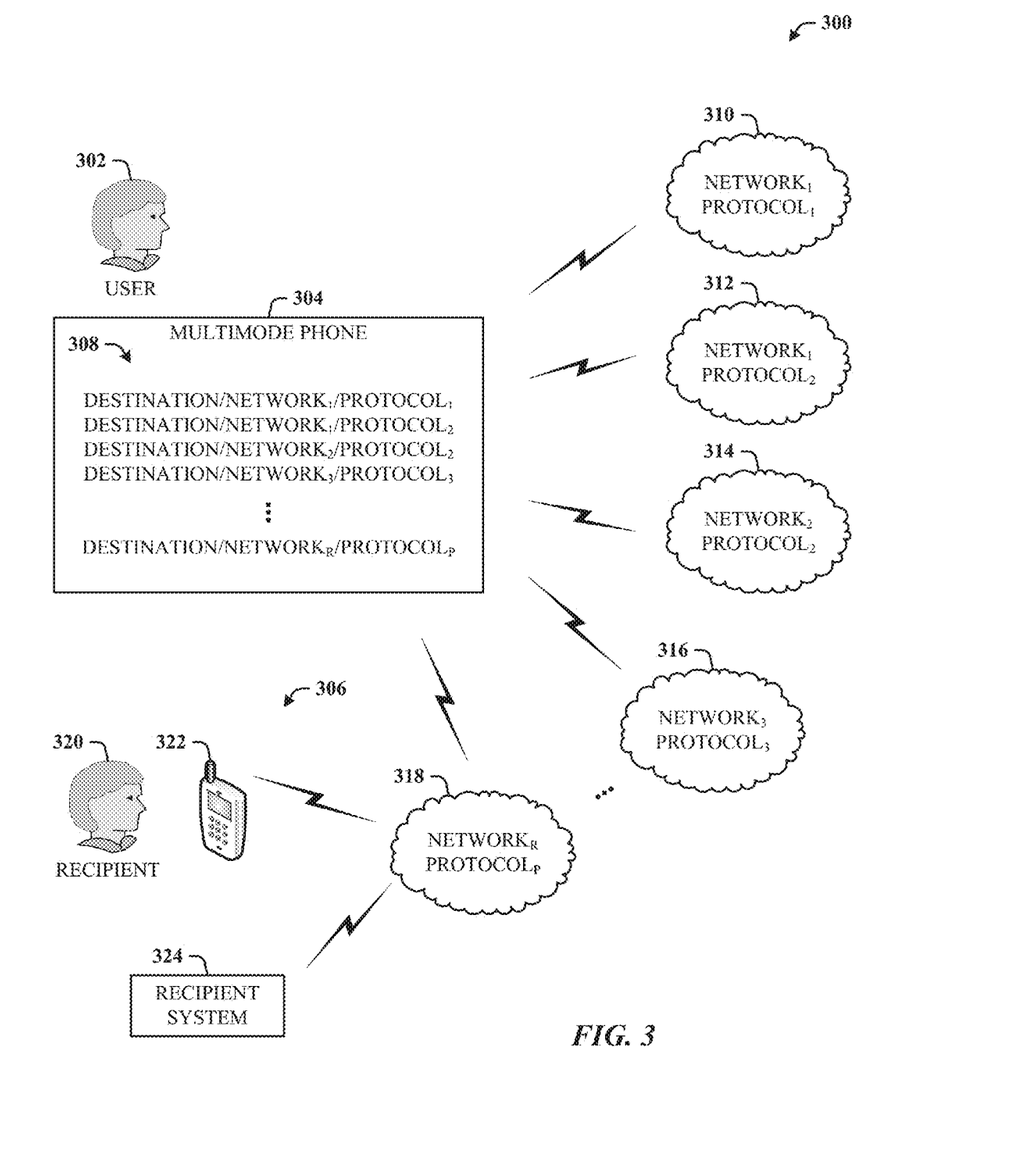
FIG. 3 illustrates a system that facilitates a variety of ways in which a phone user can configure a user multimode phone for communications to a recipient, according to the present invention.

FIG. 3 illustrates a system 300 that facilitates a variety of ways in which a phone user 302 can configure a user multimode phone 304 for communications to a recipient (or destination) 306. The user 302 can configure multiple entries 308 in the phone 304 that define communications pathways for connecting the phone user 302 to the destination 306. As depicted, a first entry (DESTINATION/$NETWORK_1$/PROTOCOL$_1$) configured by the user 302 indicates the destination 306 can be reached via a first network 310 (e.g., GSM) using a first protocol.

The destination 306 can also be configured as a second entry (DESTINATION/$NETWORK_1$/PROTOCOL$_2$) that facilitates connecting via the first network, but using a different or second protocol, as represented at a network 312. A third entry (DESTINATION/$NETWORK_2$/PROTOCOL$_2$) indicates that the destination 306 can be reached using a second network 314 (e.g., UMTS), but using the same second protocol. A fourth entry (DESTINATION/$NETWORK_3$/PROTOCOL$_3$) indicates that the destination 306 can be reached using a third network 316 (e.g., PSTN) using the third protocol (e.g., SIP for VoIP), and so on, using entries 308 up to an Rth network 318 and a Pth protocol, where R and P are positive integers.

Thus, the user can tag the destination with a protocol information (or ID) associated with a protocol that is desired to be employed. For example, the available networks may be able to process IP connections (e.g., VoIP). Thus, not only will the destination 306 be tagged with the network ID 106 but also the protocol ID (e.g., SIP) via which the connection should be made. The protocol ID can be a number, a symbol, an icon (e.g., image or graph), audio data, tactile data, or character representation. If not defined by the user 302, the ID can default to a value which may be "NULL" or an assigned value. If "NULL", then a suitable protocol can be selected at runtime.

As indicated, the destination 306 includes a recipient user 320, a recipient user phone 322, and a recipient system 324 (e.g., answering machine, fax, voicemail, etc.). It is to be understood that the entries 308 also facilitate communicating not only with the recipient phone 322, but also with the recipient system 324. For example, if the recipient user 320 is unavailable, or perhaps the recipient 320 prefers to be contacted by voicemail, the entries 308 can include the appropriate tags or mappings that will then route the connection to the appropriate destination 306 (e.g., VoIP phone), and according to the preferred protocol (e.g., SIP) and network (e.g., UMTS).

Figure 4:
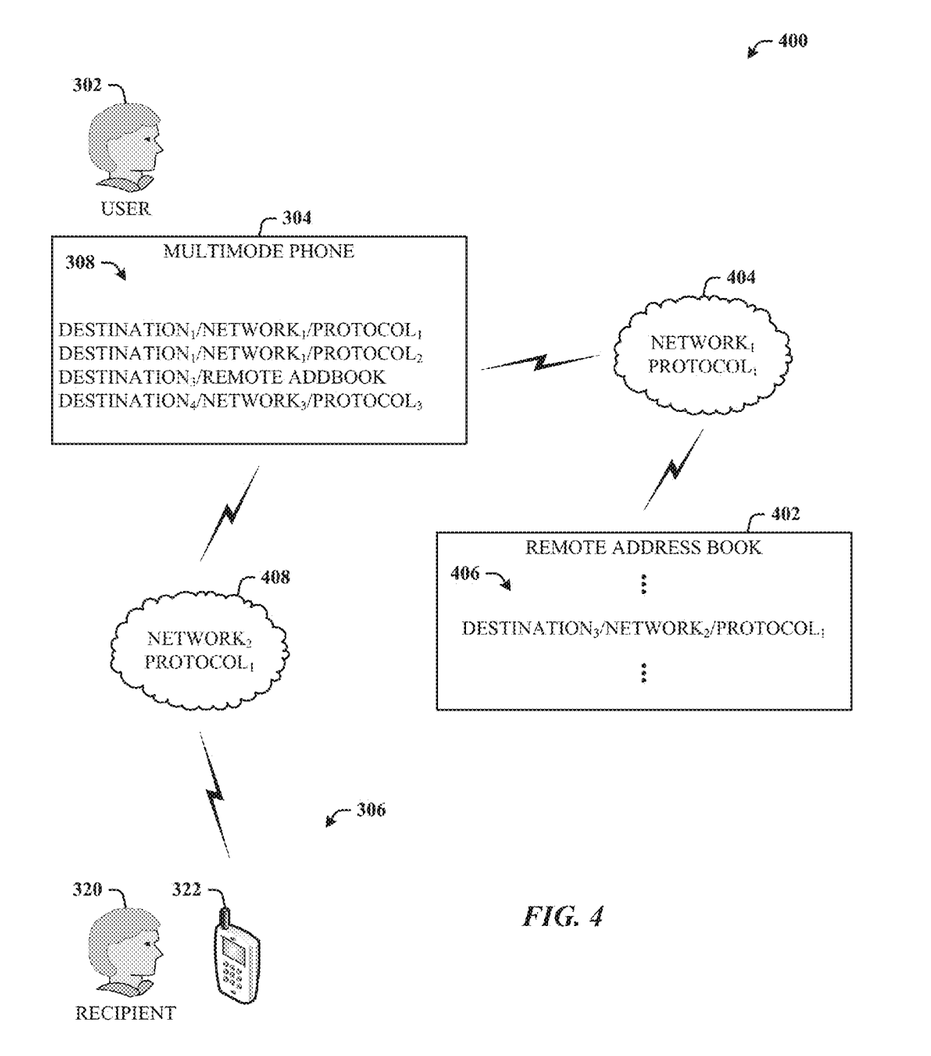
FIG. 4 illustrates a system for accessing a remote address book for connection information to a destination, according to the present invention.

FIG. 4 illustrates a system 400 for accessing a remote address book 402 for connection information to a destination 306. Here, the user 302 configures a third entry (DESTINATION$_3$/REMOTE ADDBOOK) of the entries 308 in the local address book of the phone 304 to access the remote address book 402 (via a first network 404) for further path information to connect to the recipient 320. The remote address book (or alternatively, a phone book) 402 includes a corresponding entry 406 indicating that the user phone 304 should connect to the recipient phone 322 (associated with DESTINATION$_3$) using a second network 408 (denoted NETWORK$_2$) and first protocol (PROTOCOL$_1$). The remote entry information 406 can then be sent back to the phone 304 for processing and connecting to the recipient phone 322 via the network 408.

FIGS. 5-9 show exemplary methods according to the present invention. While the methods are shown in the form of flow charts or diagrams and described as a series of acts, it is to be understood and appreciated that the present invention is not limited by the order of illustrated acts. Further, the methods can occur in a different order and/or concurrently with other acts and the methods could alternatively be represented as a series of interrelated states or events, such as in a state diagram. Moreover, not all of the illustrated acts may be required to implement the methods in accordance with the present invention.

Figure 5:
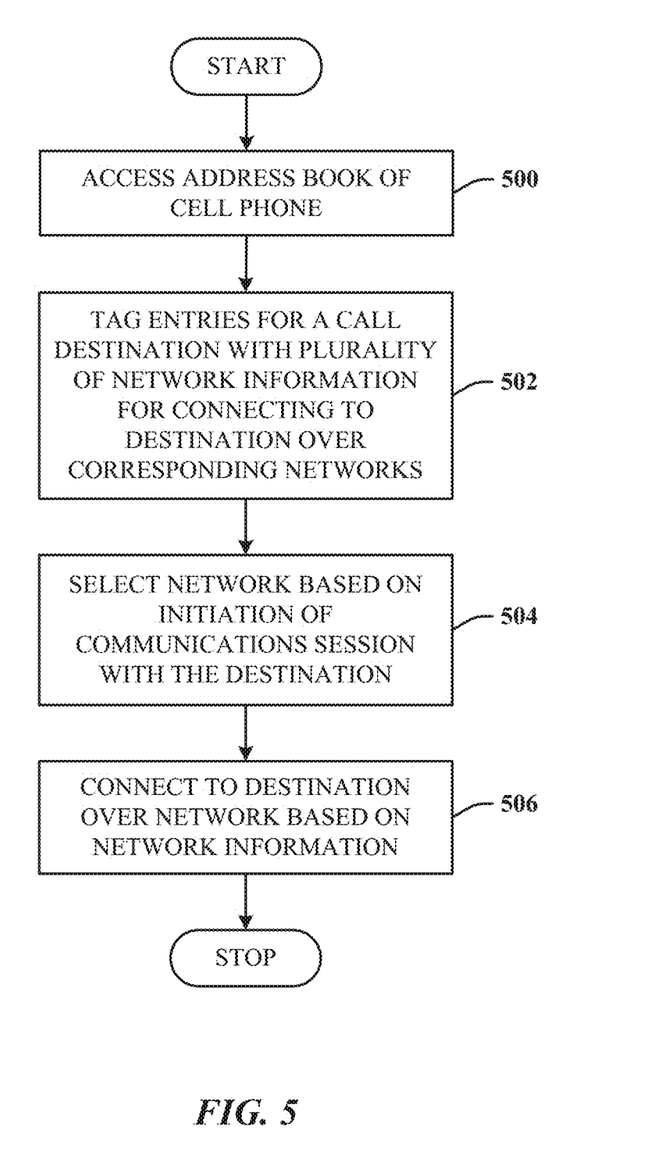
FIG. 5 illustrates a methodology of routing signal in a multimode phone, according to the present invention.

FIG. 5 illustrates an exemplary methodology of routing signal in a multimode phone. At 500, the user accesses the address book. At 502, entries for a call destination in an address book are tagged with a plurality of network information for connecting to the destination over corresponding networks. At 504, a network is selected based on initiation of a communications session to the destination. At 506, a connection is made to the destination over the network based on the network information.

Figure 6:
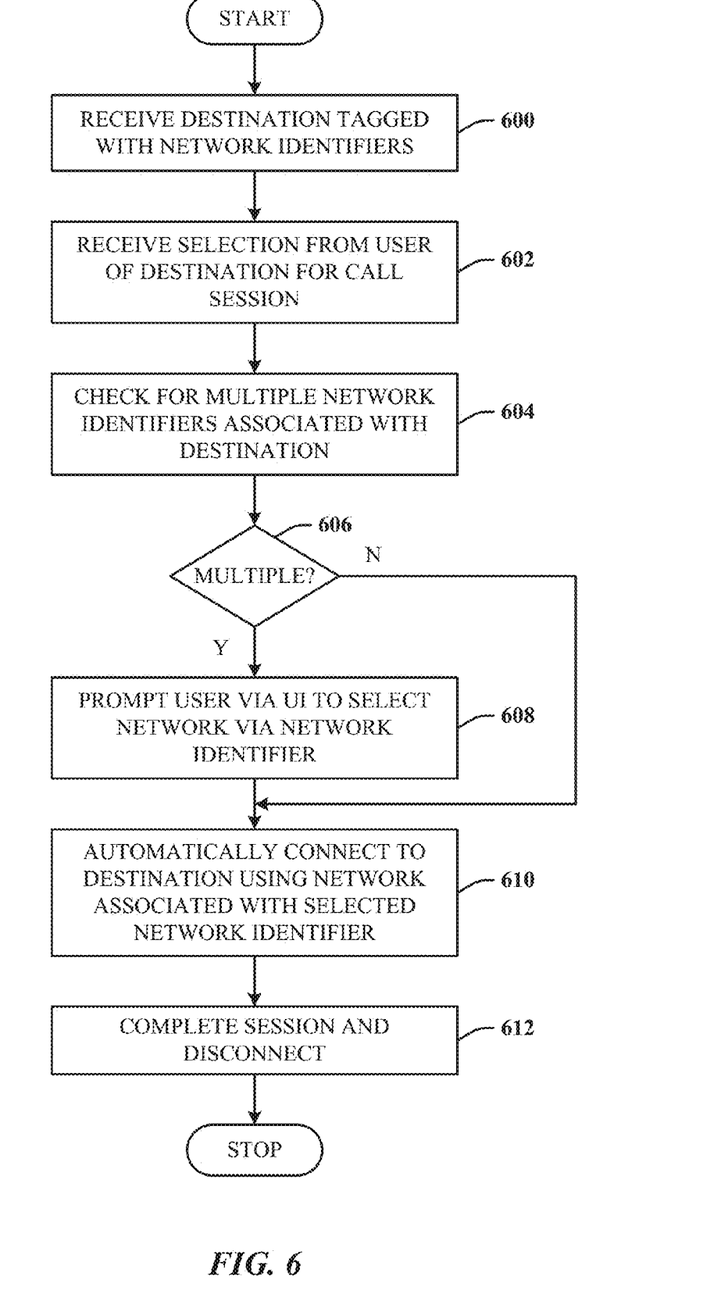
FIG. 6 illustrates a methodology of manually selecting one of multiple networks associated with a call destination, according to the present invention.

FIG. 6 illustrates an exemplary methodology of manually selecting one of multiple networks associated with a call destination. At 600, a call destination is received that is tagged with network identifiers for corresponding networks. At 602, a selection is received from the phone user for the call destination for a call session. At 604, a check is performed for multiple network identifiers associated with the destination. At 606, if there are multiple identifiers, flow is to 608 to prompt the user to select which network to complete the call to the call destination. At 610, the phone then automatically connects to the destination based on the selected network identifier. At 612, the call session is completed and the connection terminated. If, at 606, there are not multiple network identifiers associated with the destination, flow is to 610 where the call is processed according to the single entry and associated network identifier.

Figure 7:
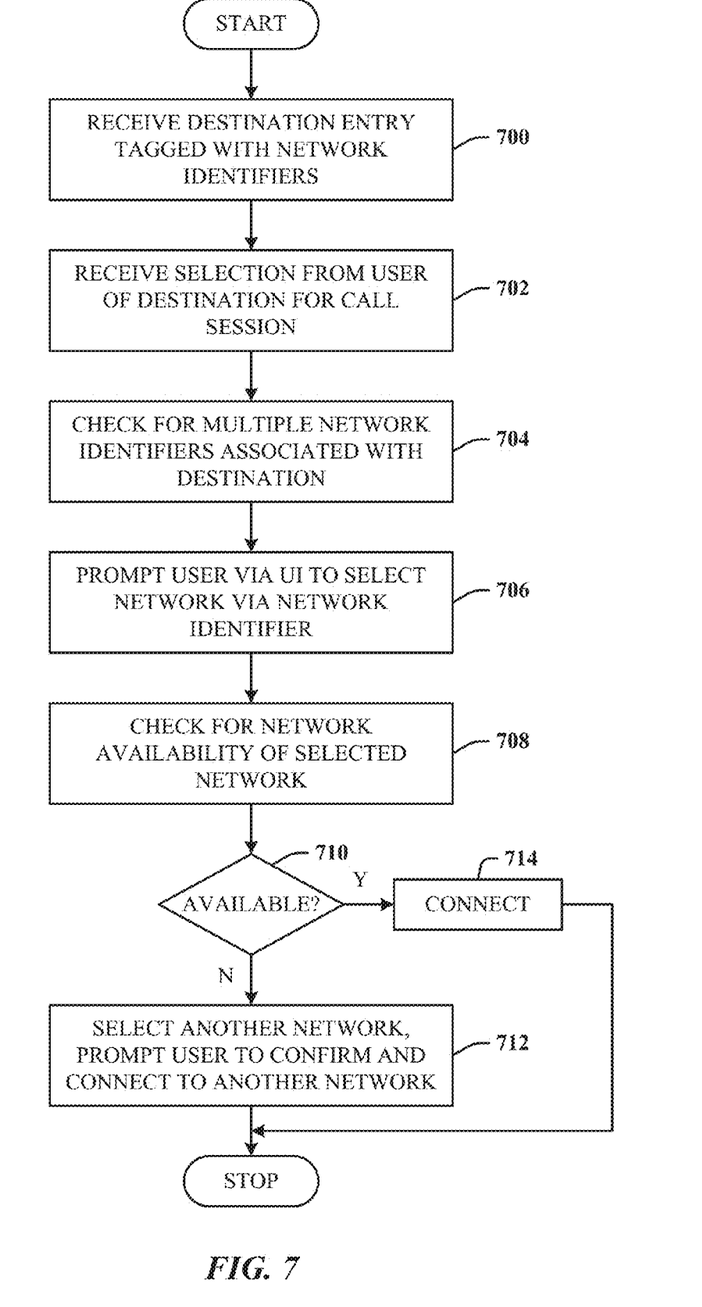
FIG. 7 illustrates a methodology of selecting another network based on availability of the selected network, according to the present invention.

FIG. 7 illustrates an exemplary methodology of selecting another network based on availability of the selected network. At 700, a call destination is received that is tagged with network identifiers for corresponding networks. At 702, a selection is received from the phone user for the call destination for a call session. At 704, a check is performed for multiple network identifiers associated with the destination. At 706, the user is prompted to select which network to complete the call to the call destination. At 708, the network of the selected destination is checked for availability. If not available, at 710, flow is to 712 to select another network, prompt the user for confirmation, and then connect to the other network. However, at 710, if the network is available, flow is to 714 to connect as before, and process the call accordingly.

Figure 8:
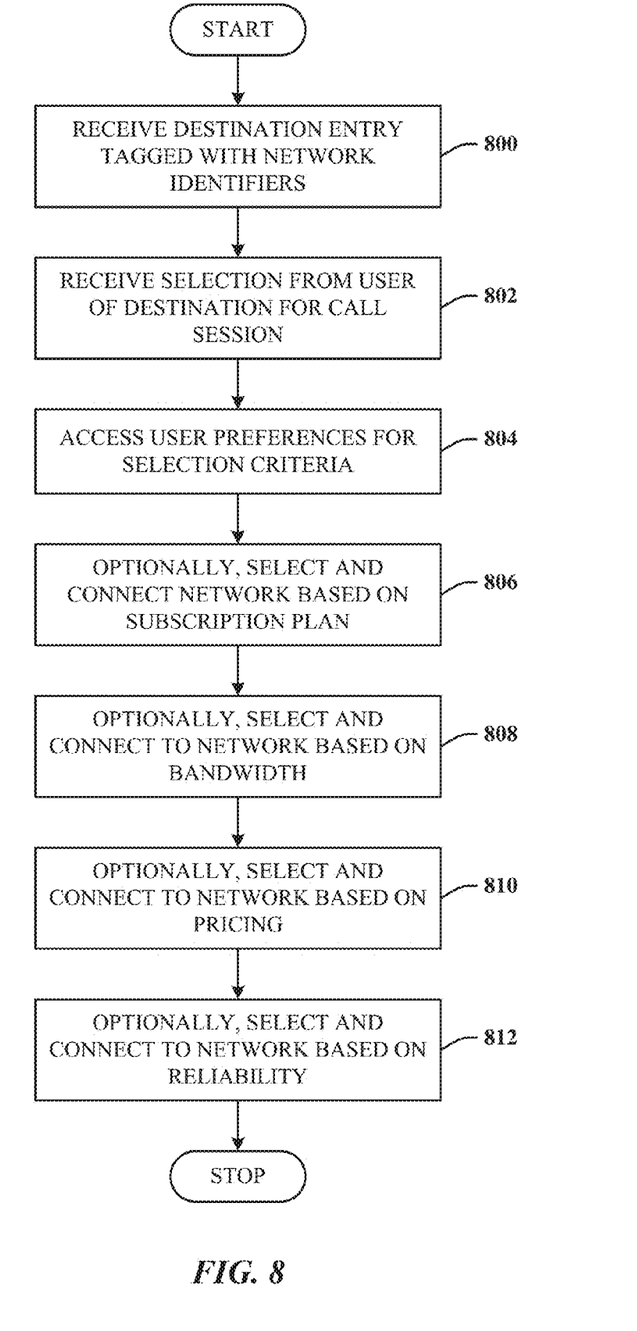
FIG. 8 illustrates a methodology of selecting a network according to criteria, according to the present invention.

Referring now to FIG. 8, there is illustrated an exemplary methodology of selecting a network according to criteria. At 800, a call destination is received that is tagged with network identifiers for corresponding networks. At 802, a selection is received from the phone user for the call destination for a call session. At 804, user preferences are accessed for selection criteria for selecting one of several possibilities associated with the call destination. Following are optional selections that can be made individually or in combination based on the criteria. At 806, optionally, select and connect to the network based on criteria related to the user subscription plan. At 808, optionally, select and connect to the network based on criteria related to the network bandwidth. At 810, optionally, select and connect to the network based on criteria related to the pricing. At 812, optionally, select and connect to the network based on criteria related to the network reliability.

Figure 9:
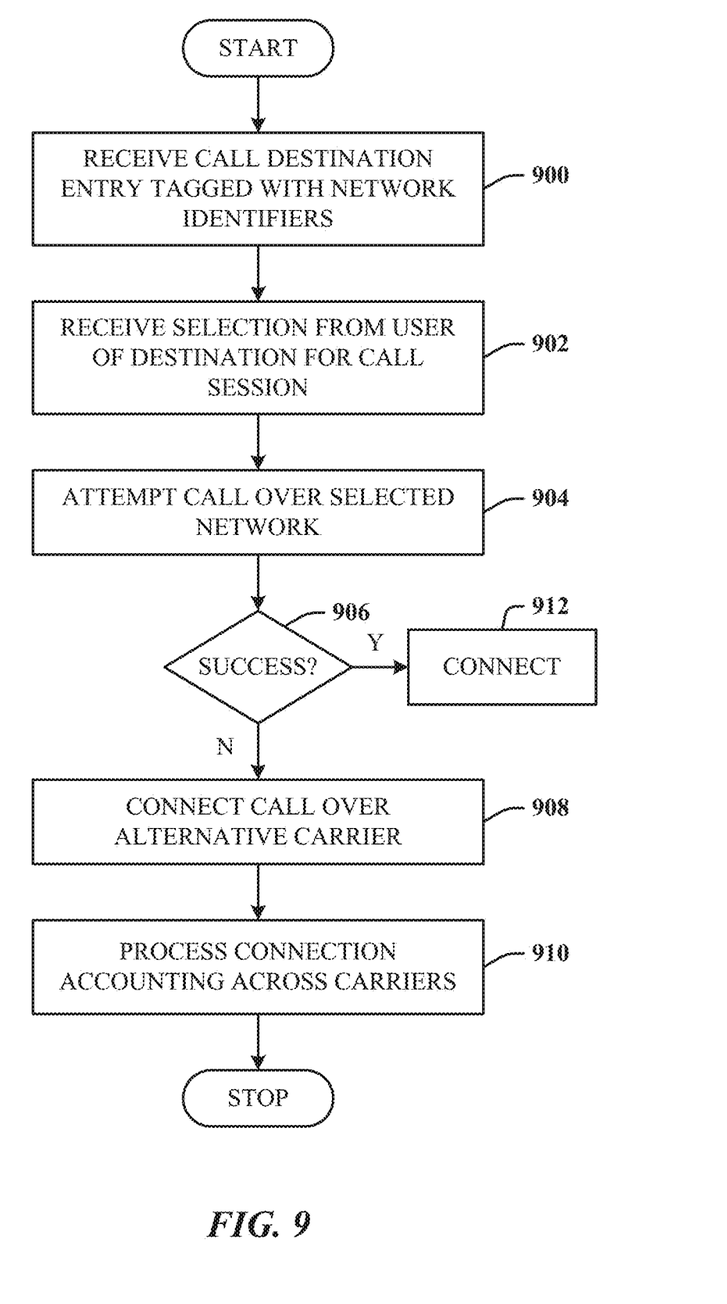
FIG. 9 illustrates a methodology of selecting a network based on coverage, according to the present invention.

FIG. 9 illustrates a methodology of selecting a network based on coverage. At 900, a call destination is received that is tagged with network identifiers for corresponding networks. At 902, a selection is received from the phone user for the call destination for a call session. At 904, the call is attempted over the selected network. At 906, if not successful, flow is to 908, to connect the call over another carrier that has coverage in the area. At 910, the connection is processed across the carriers and appropriately accounted to the user. At 906, if successful, flow is to 912 to connect normally.

As used in this application, the terms "component" and "system" include hardware, a combination of hardware and software, software, and software in execution. For example, a component can be, but is not limited to being, a process running on a processor, a processor, a hard disk drive, multiple storage drives (of optical and/or magnetic storage medium), an object, an executable, a thread of execution, a program, and/or a computer or mobile terminal (cell phone).

Figure 10:
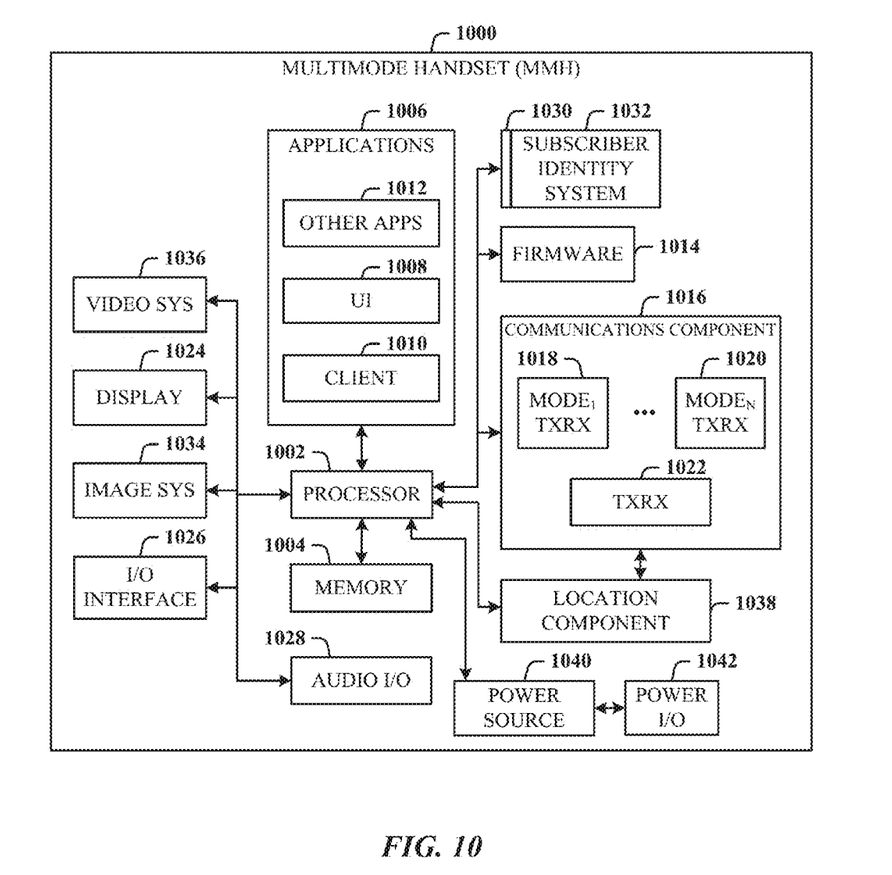
FIG. 10 illustrates a schematic block diagram of an exemplary multimode handset, according to the present invention.

FIG. 10 illustrates a schematic block diagram of an exemplary multimode handset 1000 in accordance with an innovative aspect. In order to provide additional context for various aspects thereof, FIG. 10 and the following discussion are intended to provide a brief, general description of a suitable environment in which the various aspects of the innovation can be implemented. While the description includes a general context of computer-executable instructions, the present invention can also be implemented in combination with other program modules and/or as a combination of hardware and software.

Generally, applications (e.g., program modules) can include routines, programs, components, data structures, etc., that perform particular tasks or implement particular abstract data types. Moreover, the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The handset 1000 (e.g., a cell phone) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the handset systems.

The handset 1000 includes a processor 1002 for controlling and processing onboard operations and functions. A memory 1004 interfaces to the processor 1002 for the storage of data and one or more applications 1006 (e.g., a video player software, user feedback component software, etc.). The applications 1006 can also include a user interface (UI) application 1008 that operates with a client 1010 (e.g., operating system) to facilitate user interaction with handset functionality and data, for example, answering/initiating calls, entering/deleting data, configuring settings, address book manipulation, multimode interaction, etc. The applications 1006 can include other applications 1012 installed with the handset 1000 and/or installed as add-ons or plug-ins to the client 1010 and/or UI 1008, for example, or for other purposes (e.g., processor, firmware, etc.).

The other applications 1012 can include voice recognition of predetermined voice commands that facilitate user control, call voice processing, voice recording, messaging, e-mail processing, video processing, image processing, music play, as well as subsystems or components described infra. Some of the applications 1006 can be stored in the memory 1004 and/or in a firmware 1014, and executed by the processor 1002 from either or both the memory 1004 or/and the firmware 1014. The firmware 1014 can also store code for execution in power-up initialization and control during normal operation of the handset 1000.

A communications component 1016 can interface with the processor 1002 to facilitate wired/wireless communications with external systems, for example, cellular networks, VoIP (voice-over-IP) networks, local wireless networks or personal wireless networks such as Wi-Fi, Wi-Max, and so on. Here, the communications component 1016 can also include a multimode communications subsystem for providing cellular communications via different cellular technologies. For example, a first cellular transceiver 1018 (e.g., GSM) can be one mode and an Nth transceiver 1020 can provide cellular communications via an Nth cellular network (e.g., UMTS), where N is a positive integer. The communications component 1016 can also include a transceiver 1022 for unlicensed communications (e.g., Wi-Fi, Wi-Max, Bluetooth, etc.) for corresponding communications. The communications component 1016 can also facilitate communications reception from terrestrial radio networks (e.g., broadcast), digital satellite radio networks, and Internet-based radio services networks.

The handset 1000 can process IP data traffic via the communications component 1016 to accommodate IP traffic from an IP network such as, for example, the Internet, a corporate intranet, a home broadband network, a personal area network, etc., via an ISP or broadband cable provider. Thus, VoIP traffic can be utilized by the handset 1000 and IP-based multimedia content can be received in an encoded and/or decoded format.

The handset 1000 includes a display 1024 for displaying multimedia that include text, images, video, telephony functions (e.g., a Caller ID function), setup functions, menus, etc. The display 1024 can also accommodate the presentation of multimedia content (e.g., music metadata, messages, wallpaper, graphics, etc.).

An input/output (I/O) interface 1026 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 1026 can be utilized for updating and/or troubleshooting the handset 1000, for example.

Audio capabilities can be provided via an audio I/O component 1028, which can include a speaker for the output of audio signals related to, for example, indication that the user pressed the proper key or key combination to initiate the user feedback signal, call signals, music, etc. The audio I/O component 1028 also facilitates the input of audio signals via a microphone to record data and/or telephony voice data, and for inputting voice signals for telephone conversations.

The handset 1000 can include a slot interface 1030 for accommodating a subscriber identity system 1032 that can accommodate a SIM or universal SIM (USIM), and interfacing the subscriber identity system 1032 with the processor 1002. However, it is to be appreciated that the subscriber identity system 1032 can be manufactured into the handset 1000, and updated by downloading data and software thereinto.

An image capture and processing system 1034 (e.g., a camera) can be provided for decoding encoded image content. Additionally, as indicated, photos can be obtained via an associated image capture subsystem of the image system 1034. The handset 1000 can also include a video component 1036 for processing video content received and, for recording and transmitting video content.

Optionally, a geolocation component 1038 (e.g., GPS-global positioning system) facilitates receiving geolocation signals (e.g., from satellites via the communications component 1016) that define the location of the handset 1000. Alternatively, or in combination therewith, the geolocation component 1038 can facilitate triangulation processing for locating the handset 1000.

The handset 1000 also includes a power source 1040 in the form of batteries and/or an AC power subsystem, which power source 1040 can interface to an external power system or charging equipment (not shown) via a power I/O component 1042.

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wire Ethernet networks used in many offices.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multimode mobile phone comprising:
a processor; and
a memory storing instructions that, when executed by the processor, cause the processor to perform operations comprising
receiving, via a user interface, destination data corresponding to a destination device;
receiving, via the user interface, a first network identifier corresponding to a first network to be associated with the destination data corresponding to the destination device and a second network identifier corresponding to a second network to be associated with the destination data corresponding to the destination device,
assigning the first network identifier to the destination data corresponding to the destination device to generate a first entry associated with the destination device, wherein the first entry indicates that the destination device can be reached via the first network corresponding to the first network identifier, assigning the second network identifier to the destination data corresponding to the destination device to generate a second entry associated with the destination device, wherein the second entry indicates that the destination device can be reached via the second network corresponding to the second network identifier, receiving an initiation of a communication to the destination device, in response to receiving the initiation of the communication to the destination device, selecting, from between the first entry associated with the destination device and the second entry associated with the destination device, based at least in part on a user subscription plan, the first network corresponding to the first network identifier of the first entry for connecting the multimode mobile phone with the destination device, and connecting, via the first network corresponding to the first network identifier of the first entry associated with the destination device, to the destination device.

2. The multimode mobile phone of claim 1, wherein the operations further comprise receiving, via the user interface, a first protocol to be associated with the first network identifier and a second protocol to be associated with the second network identifier, wherein assigning the first network identifier to the destination data corresponding to the destination device to generate the first entry associated with the destination device further comprises assigning both the first network identifier and the first protocol to the destination data corresponding to the destination data to generate the first entry associated with the destination device, and wherein assigning the second network identifier to the destination data corresponding to the destination device to generate the second entry comprises assigning both the second network identifier and the second protocol to the destination data corresponding to the destination device to generate the second entry associated with the destination device.

3. The multimode mobile phone of claim 1, wherein the operations further comprise:

receiving, via the user interface, a first protocol to be associated with the second network identifier and a second protocol to be associated with the second network identifier, wherein assigning the second network identifier to the destination data corresponding to the destination device to generate the second entry associated with the destination device comprises assigning both the second network identifier and the first protocol to the destination data corresponding to the destination data to generate the second entry associated with the destination device; and assigning both the second network identifier and the second protocol to the destination data corresponding to the destination device to generate a third entry associated with the destination device.

4. The multimode mobile phone of claim 1, wherein the user subscription plan indicates a level of service that allows communications over the first network but not over the second network.

5. The multimode mobile phone of claim 1, wherein selecting from between the first entry associated with the destination device and the second entry associated with the destination device is further based on a network bandwidth associated with the first network versus a network bandwidth associated with the second network.

6. The multimode mobile phone of claim 1, wherein the user subscription plan determines a capability of the multimode mobile phone to communicate over different networks.

7. The multimode mobile phone of claim 1, wherein each of the first network identifier and the second network identifier is associated with a respective carrier.

8. A method comprising:

receiving, by a multimode mobile phone comprising a processor, via a user interface, destination data corresponding to a destination device;

receiving, by the processor, via the user interface, a first network identifier corresponding to a first network to be associated with the destination data corresponding to the destination device and a second network identifier corresponding to a second network to be associated with the destination data corresponding to the destination device;

assigning, by the processor, the first network identifier to the destination data corresponding to the destination device to generate a first entry associated with the destination device, wherein the first entry indicates that the destination device can be reached via the first network corresponding to the first network identifier;

assigning, by the processor, the second network identifier to the destination data corresponding to the destination device to generate a second entry associated with the destination device, wherein the second entry indicates that the destination device can be reached via the second network corresponding to the second network identifier;

receiving, by the processor, an initiation of a communication to the destination device;

in response to receiving the initiation of the communication to the destination device, selecting, by the processor, from between the first entry associated with the destination device and the second entry associated with the destination device, based at least in part on a user subscription plan, the first network corresponding to the first network identifier of the first entry for connecting the multimode mobile phone with the destination device; and connecting, by the processor, via the first network corresponding to the first network identifier of the first entry associated with the destination device, to the destination device.

9. The method of claim 8, further comprising receiving, via the user interface, a first protocol to be associated with the first network identifier and a second protocol to be associated with the second network identifier, wherein assigning the first network identifier to the destination data corresponding to the destination device to generate the first entry associated with the destination device further comprises assigning both the first network identifier and the first protocol to the destination data corresponding to the destination data to generate the first entry associated with the destination device, and wherein assigning the second network identifier to the destination data corresponding to the destination device to generate the second entry comprises assigning both the second network identifier and the second protocol to the destination data corresponding to the destination device to generate the second entry associated with the destination device.

10. The method of claim 8, further comprising:
receiving, via the user interface, a first protocol to be associated with the second network identifier and a second protocol to be associated with the second network identifier, wherein assigning the second network identifier to the destination data corresponding to the destination device to generate the second entry associated with the destination device comprises assigning both the second network identifier and the first protocol to the destination data corresponding to the destination data to generate the second entry associated with the destination device; and
assigning both the second network identifier and the second protocol to the destination data corresponding to the destination device to generate a third entry associated with the destination device.

11. The method of claim 8, wherein the user subscription plan indicates a level of service that allows communications over the first network but not over the second network.

12. The method of claim 8, wherein selecting from between the first entry associated with the destination device and the second entry associated with the destination device is further based on a network bandwidth associated with the first network versus a network bandwidth associated with the second network.

13. The method of claim 8, wherein the user subscription plan determines a capability of the multimode mobile phone to communicate over different networks.

14. The method of claim 8, wherein each of the first network identifier and the second network identifier is associated with a respective carrier.

15. A non-transitory computer-readable storage device storing computer-executable instructions that, when executed by a processor of a multimode mobile phone cause the processor to perform operations comprising:
receiving, via a user interface, destination data corresponding to a destination device;
receiving, via the user interface, a first network identifier corresponding to a first network to be associated with the destination data corresponding to the destination device and a second network identifier corresponding to a second network to be associated with the destination data corresponding to the destination device;
assigning the first network identifier to the destination data corresponding to the destination device to generate a first entry associated with the destination device, wherein the first entry indicates that the destination device can be reached via the first network corresponding to the first network identifier;
assigning the second network identifier to the destination data corresponding to the destination device to generate a second entry associated with the destination device, wherein the second entry indicates that the destination device can be reached via the second network corresponding to the second network identifier;
receiving an initiation of a communication to the destination device;
in response to receiving the initiation of the communication to the destination device, selecting, from between the first entry associated with the destination device and the second entry associated with the destination device, based at least in part on a user subscription plan, the first network corresponding to the first network identifier for the first entry for connecting the multimode mobile phone with the destination device; and
connecting, via the first network corresponding to the first network identifier of the first entry associated with the destination device, to the destination device.

16. The non-transitory computer-readable storage device of claim 15, wherein the operations further comprise receiving, via the user interface, a first protocol to be associated with the first network identifier and a second protocol to be associated with the second network identifier, wherein assigning the first network identifier to the destination data corresponding to the destination device to generate the first entry associated with the destination device further comprises assigning both the first network identifier and the first protocol to the destination data corresponding to the destination data to generate the first entry associated with the destination device, and wherein assigning the second network identifier to the destination data corresponding to the destination device to generate the second entry comprises assigning both the second network identifier and the second protocol to the destination data corresponding to the destination device to generate the second entry associated with the destination device.

17. The non-transitory computer-readable storage device of claim 15, wherein the operations further comprise:
receiving, via the user interface, a first protocol to be associated with the second network identifier and a second protocol to be associated with the second network identifier, wherein assigning the second network identifier to the destination data corresponding to the destination device to generate the second entry associated with the destination device comprises assigning both the second network identifier and the first protocol to the destination data corresponding to the destination data to generate the second entry associated with the destination device; and
assigning both the second network identifier and the second protocol to the destination data corresponding to the destination device to generate a third entry associated with the destination device.

18. The non-transitory computer-readable storage device of claim 15, wherein the user subscription plan indicates a level of service that allows communications over the first network but not over the second network.

19. The non-transitory computer-readable storage device of claim 15, wherein selecting from between the first entry associated with the destination device and the second entry associated with the destination device is further based on a network bandwidth associated with the first network versus a network bandwidth associated with the second network.

20. The non-transitory computer-readable storage device of claim 15, wherein the user subscription plan determines a capability of the multimode mobile phone to communicate over different networks.

* * * * *